(12) United States Patent
Raudsepp (10) Patent No.: US 12,263,546 B2
(45) Date of Patent: *Apr. 1, 2025

(54) BALANCE AND OFFSET IN ADAPTIVE SUBMERGED ARC WELDING

(71) Applicant: ESAB AB, Gothenburg (SE)

(72) Inventor: Hannes Raudsepp, Täby (SE)

(73) Assignee: ESAB AB, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,482

(22) Filed: Jan. 22, 2024

(65) Prior Publication Data

US 2024/0157459 A1   May 16, 2024

Related U.S. Application Data

(63) Continuation of application No. 16/934,093, filed on Jul. 21, 2020, now Pat. No. 11,919,110.

(51) Int. Cl.
| | |
|---|---|
| G01B 11/28 | (2006.01) |
| B23K 9/095 | (2006.01) |
| B23K 9/12 | (2006.01) |
| B23K 9/18 | (2006.01) |
| G05B 19/042 | (2006.01) |

(52) U.S. Cl.
CPC ............ B23K 9/186 (2013.01); B23K 9/0953 (2013.01); B23K 9/0956 (2013.01); B23K 9/125 (2013.01); G01B 11/285 (2013.01); G05B 19/042 (2013.01); *G05B 2219/23251* (2013.01)

(58) Field of Classification Search
None
See application file for complete search history.

(56) References Cited

U.S. PATENT DOCUMENTS

| | | | |
|---|---|---|---|
| 5,444,356 A | 8/1995 | Reynolds et al. | |
| 6,111,216 A | 8/2000 | Stava | |

(Continued)

FOREIGN PATENT DOCUMENTS

| | | |
|---|---|---|
| CN | 104227181 A | 12/2014 |
| CN | 105345237 A | 2/2016 |

(Continued)

OTHER PUBLICATIONS

Notification of Transmittal of International Search Report and Written Opinion including International Search Report and Written Opinion for International Application No. PCT/IB2021/056518 dated Sep. 29, 2021, 15 pages.

(Continued)

*Primary Examiner* — Nathan L Laughlin (74) *Attorney, Agent, or Firm* — Edell, Shapiro & Finnan, LLC (57) ABSTRACT

A method includes monitoring a submerged arc welding (SAW) operation in real-time; determining, based on the monitoring and in real-time, a discrepancy between a desired weld parameter and an actual weld parameter of a weld resulting from the SAW operation; and in response to determining the discrepancy, controlling a power supply, which provides power for the SAW operation, to modify at least one of balance or offset of an alternating current (AC) welding power signal supplied for the SAW operation to compensate for the discrepancy.

20 Claims, 7 Drawing Sheets

(56) References Cited

U.S. PATENT DOCUMENTS

| | | |
|---|---|---|
| 6,472,634 B1 | 10/2002 | Houston et al. |
| 6,479,793 B1 | 11/2002 | Wittmann et al. |
| 6,660,966 B2 | 12/2003 | Houston et al. |
| 6,855,912 B2 | 2/2005 | Houston et al. |
| 6,940,040 B2 | 9/2005 | Houston et al. |
| 7,064,290 B2 | 6/2006 | Blankenship et al. |
| 7,166,817 B2 | 1/2007 | Stava et al. |
| 7,217,904 B2 | 5/2007 | Blankenship et al. |
| 8,242,410 B2 | 8/2012 | Peters |
| 8,269,141 B2 | 9/2012 | Daniel et al. |
| 8,785,816 B2 | 7/2014 | Kooken et al. |
| 8,785,817 B2 | 7/2014 | Luck et al. |
| 9,006,609 B2 | 4/2015 | Stava et al. |
| 9,457,420 B2 | 10/2016 | Chen et al. |
| 9,511,441 B2 | 12/2016 | Cole et al. |
| 9,751,150 B2 | 9/2017 | Daniel et al. |
| 9,855,620 B2 | 1/2018 | Kooken et al. |
| 2007/0278196 A1 | 12/2007 | James et al. |
| 2008/0011728 A1 | 1/2008 | Peters et al. |
| 2009/0261073 A1 | 10/2009 | Mui |
| 2012/0006800 A1 | 1/2012 | Ryan et al. |
| 2012/0111837 A1* | 5/2012 | Al-Mostaneer ...... B23K 9/0284 219/73 |
| 2012/0298724 A1* | 11/2012 | Kato ................. B23K 20/1245 228/2.1 |
| 2013/0193124 A1 | 8/2013 | Peters |
| 2015/0266125 A1 | 9/2015 | Enyedy et al. |
| 2017/0072495 A1 | 3/2017 | Cole et al. |
| 2017/0368631 A1 | 12/2017 | Melfi et al. |
| 2018/0264577 A1 | 9/2018 | Peters |
| 2019/0160594 A1 | 5/2019 | Flamm et al. |

FOREIGN PATENT DOCUMENTS

| | | |
|---|---|---|
| CN | 108941859 A | 12/2018 |
| JP | S5992170 A | 5/1984 |
| SU | 612758 A1 | 6/1978 |

OTHER PUBLICATIONS

Pedrazzo G et al., AC/DC Generators with Waveform Control, Innovation in Submerged Arc Welding, Welding International, Taylor & Francis, Abingdon, GB, vol. 23, No. 11, Nov. 1, 2009, pp. 839-845.

Office Action for Chinese Patent Application No. 202180051038.X mailed Jan. 23, 2025 with English machine translation, 18 pages.

* cited by examiner

BALANCE AND OFFSET IN ADAPTIVE SUBMERGED ARC WELDING

This application is a continuation of U.S. application Ser. No. 16/934,093, filed Jul. 21, 2020, the entirety of which is incorporated herein by reference.

BACKGROUND

Submerged arc welding (SAW) is a welding technique characterized by high productivity and quality, often used for longer welding seams in thicker materials. In a SAW process, a continuously fed consumable electrode (e.g., a welding wire) is used to conduct a weld current through a workpiece. The weld current forms an arc between the welding wire and the workpiece to create a molten weld pool on the workpiece. This welding wire is generally referred to as a hot wire, and two or more welding wires can be employed in parallel in the welding process, depending on the desired deposition rate and weld requirements. When multiple wires are used, one such wire may be employed as a so-called "cold" wire, in that no current passes through that wire. A single cold wire is sometimes employed together with two hot wires.

The molten weld material and the electric arc in a SAW process are typically protected from atmospheric contamination by being submerged beneath a layer of pulverized flux. The flux melts in part during the welding process, thus creating a protective layer of slag on the weld pool.

For a specific set of welding parameters, a SAW welding process achieves a certain penetration depth. In general, employing direct current (DC) power provides increased penetration depth, which may be particularly advantageous in an initial root run of the welding process. For example, in the case of fillet welding, reliably achieving a certain penetration depth may avoid time-consuming joint preparation steps and may ensure that required load bearing properties of the welded structure are met. In the case of butt welding, deeper penetration results in an increase in the root area, allowing for a smaller joint cross-sectional area to fill and potentially reducing the welding time and the number of passes or "runs" required to complete the weld. In each case, deeper penetration results in higher productivity by diminishing the overall production time. In some welding operations, a root run is performed using DC power and subsequent runs are performed using alternating current (AC) power.

In conventional SAW welding processes, the operating parameters that control the energy applied to the weld (e.g., the current applied to the wire electrode, the wire feed speed, and the resultant arc length and electrode voltage) are typically maintained at relatively low levels to avoid the possibility of hot cracks in a run or surface-breaking cracks. However, continuously maintaining a safety margin in the operating parameters may result in reduced penetration depth and/or deposition rate, resulting in the need for a greater number of runs, and lower overall productivity. Throughout a given welding run it is also desirable to consider the overall "heat input", which can impact the mechanical properties, e.g., quality of the weld.

Figure 1:
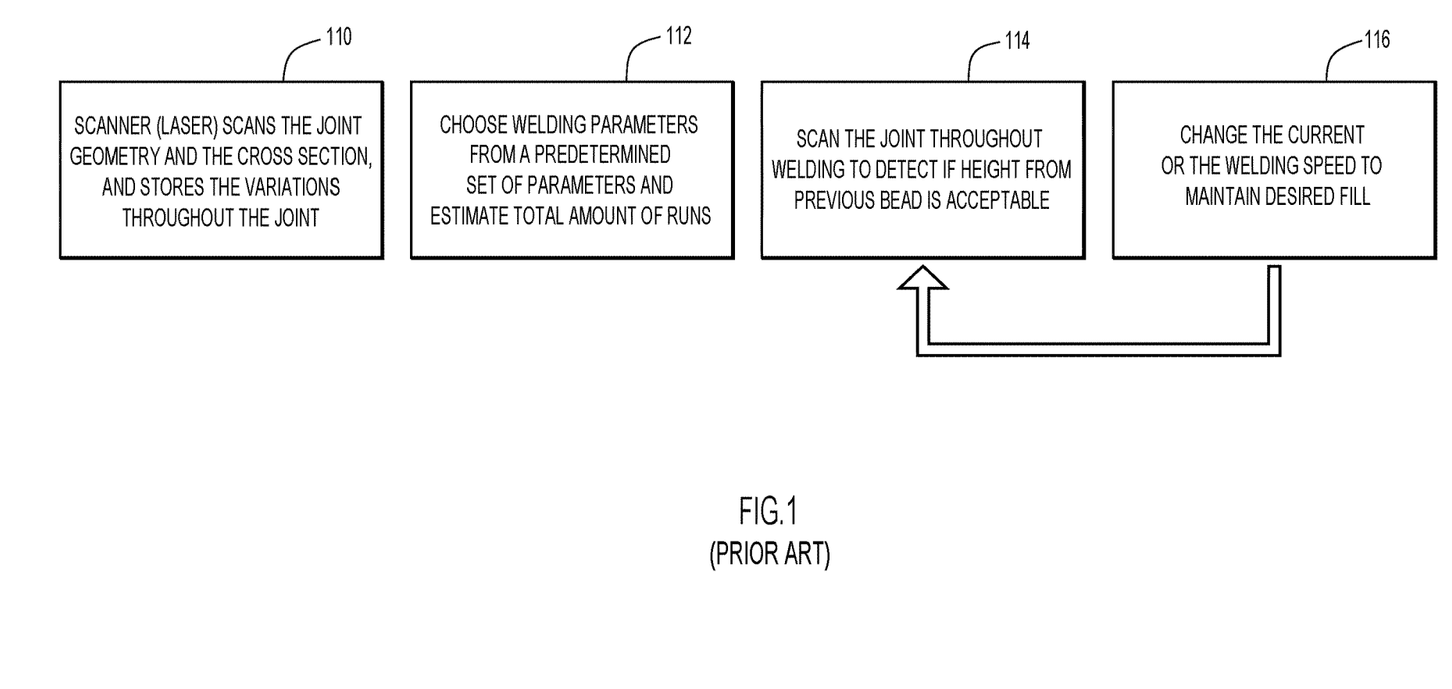
FIG. 1 is flow diagram of an adaptive welding approach according to the prior art.

Consistent with the foregoing, FIG. 1 is flow diagram of an adaptive welding approach according to the prior art. In an adaptive welding system, a scanner scans what has been welded and sets parameters automatically. Present solutions are configured to control so-called "active parameters" including amperage (current), (arc) voltage, and travel speed. As shown, at 110, a scanner (e.g., a laser) scans a weld joint geometry, e.g., its cross section, and stores associated measurement values for the length of the joint. At 112, the system chooses welding parameters from a predetermined set of parameters and makes an estimate of the total amount of runs. At 114, the scanner, placed in front of the welding torch scans the joint throughout the welding process to detect if the height from a previous bead is acceptable (i.e., within a predetermined tolerance). At 116, the system changes active parameters such as the current or the welding speed to maintain the desired fill.

The challenge with the above approach is that any change in active parameters (current, voltage or travel speed) will change the overall heat input and thus the mechanical properties of the heat affected zone (HAZ).

SUMMARY

Disclosed herein are techniques for improving a SAW welding process. A method includes monitoring a submerged arc welding (SAW) operation in real-time; determining, based on the monitoring and in real-time, a discrepancy between a desired weld parameter and an actual weld parameter of a weld resulting from the SAW operation; and in response to determining the discrepancy, controlling a power supply, which provides power for the SAW operation, to modify at least one of balance or offset of an alternating current (AC) welding power signal supplied for the SAW operation to compensate for the discrepancy.

An apparatus configured to perform submerged arc welding (SAW) may include a wire feeder mechanism to guide at least one welding wire toward a workpiece; a flux delivery system to supply flux to the workpiece; a power supply to supply alternating current (AC) welding power signal to the welding wire to create a molten weld pool on the workpiece; and a controller configured to: determine a discrepancy between a desired weld parameter and an actual weld parameter of a weld formed by the SAW apparatus, and modify at least one of balance or offset of the AC welding power signal to compensate for the discrepancy.

BRIEF DESCRIPTION OF THE DRAWINGS

Like numerals identify like components throughout the figures.

DETAILED DESCRIPTION

Embodiments described herein are configured to modify deposition rates and/or penetration in real time of a welding process with very little, or even no, change in heat input, thus avoiding undesirable changes to the mechanical properties of the HAZ.

Figure 2:
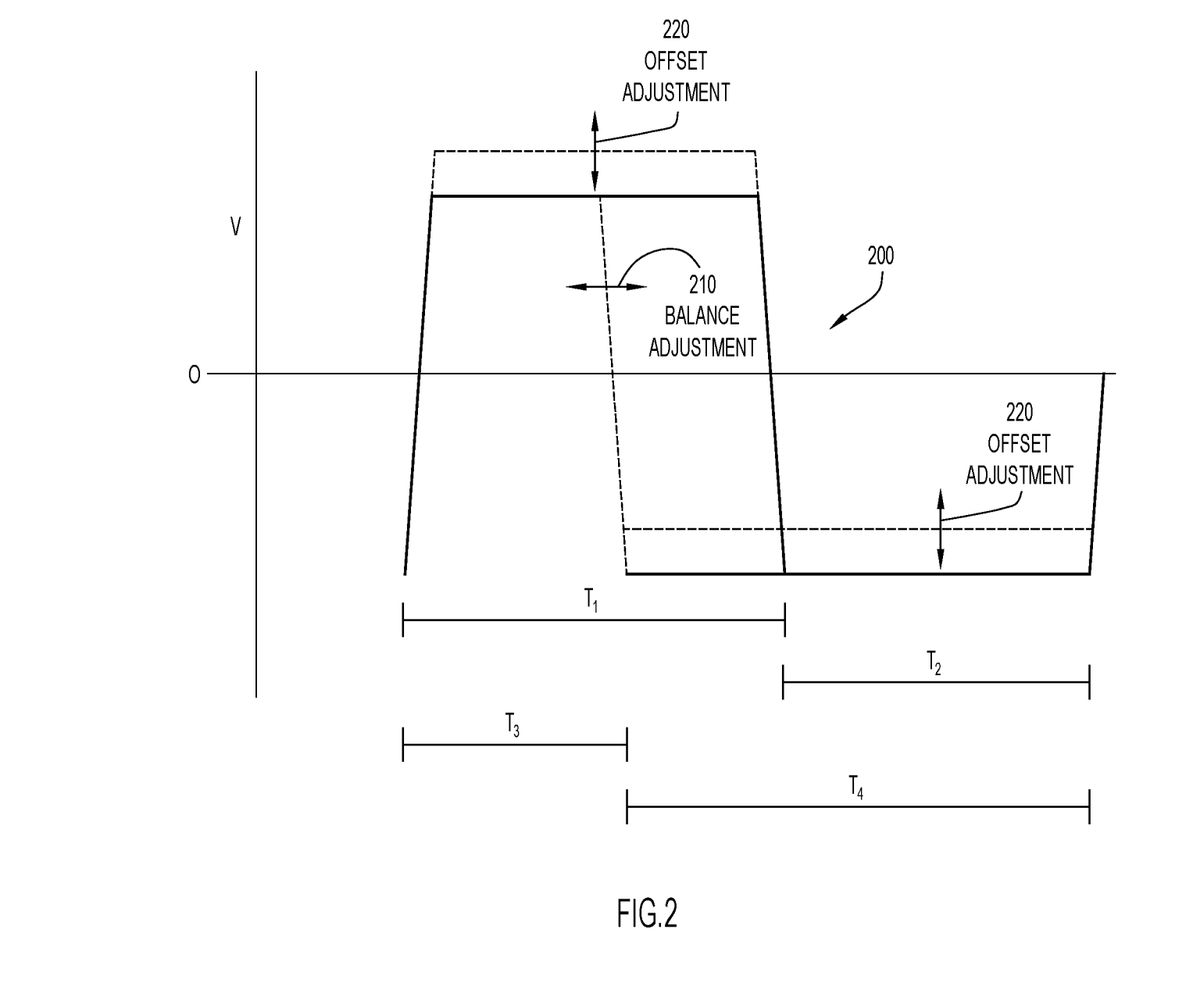
FIG. 2 is a graph showing how balance and offset affect the shape of a given cycle of an AC welding power signal according to an example embodiment.

FIG. 2 is a graph showing how balance and offset affect the shape of a given cycle of an AC welding power signal 200. As noted above, in some instances, it may be desirable to begin a welding operation with DC welding power, but then transition to an AC welding power signal at some subsequent time. As shown in FIG. 2, AC welding power signal 200 may have substantially equal dwell times on the positive side and negative side as shown by periods T1 and T2, where T1 and T2 are substantially equal in time. However, it is possible to change the balance of the AC wave form such that, e.g., period T3 on the positive side is less than the period T4 on the negative side of the cycle. In an example embodiment, period T3 might account for 25% of the overall cycle time, and T4 might account of 75% of the cycle time, and such an arrangement might be characterized as having a 25% balance. Arrow 210 indicates a balance adjustment, i.e., when a transition occurs from positive to negative in a given cycle of the AC welding power signal 200.

Those skilled in the art will appreciate that the amount of dwell time on the positive side and the negative side (i.e., balance) can be controlled as desired (from 0%-100%) depending on the nature of the material being welded and the welding process, among other considerations. Those skilled in the art will also appreciate that, although not shown explicitly in FIG. 2, the dwell time on the positive side of the cycle could be greater than the dwell time on the negative side of the cycle.

Similarly, the magnitude of the voltage of the AC welding power signal 200 both on the positive side and the negative side can be controlled such that they are not necessarily symmetric across zero volts. For example, a voltage offset might be on the order of 0-10 volts with respect to the opposite polarity voltage level, with a typical offset of e.g., +/−3-5 volts on either the positive or negative side, or both. The offset adjustment is shown by arrow 220 in FIG. 2.

As will be explained more fully below, it is possible to control balance and/or offset of the AC welding power signal 200 to effect changes to a welding process, without changing active parameters, and without changing, or with very little change to, the heat input. For example, by using voltage offset, it is possible to change the deposition rate of a welding process (and thus the resulting cross section of a given weld) by as much as +10% and −5%. Further, by using balance control, it is possible change the deposition rate by as much as ±15-20%. In accordance with an embodiment, balance and voltage offset can be combined in a control process to vary together to achieve a desired weld.

Figure 3:
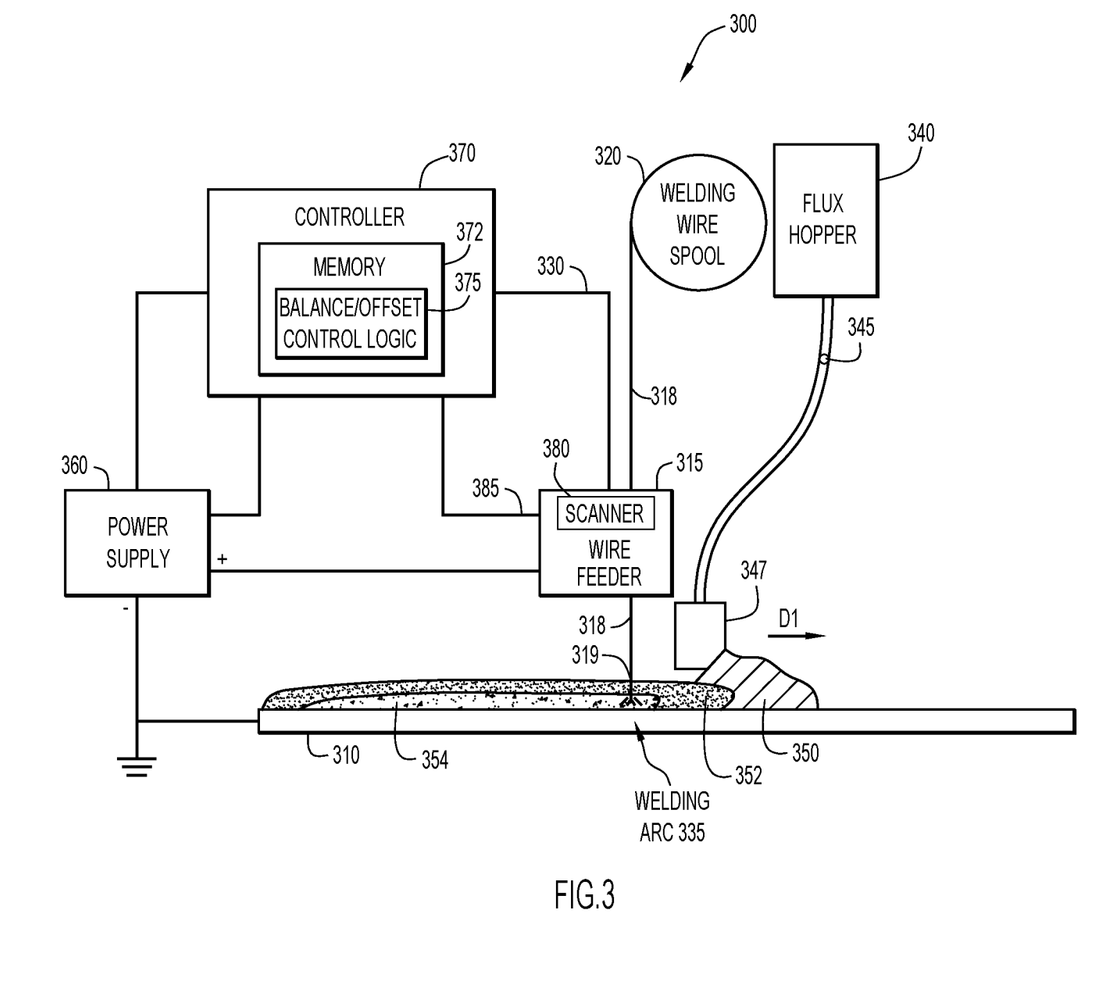
FIG. 3 is a block diagram of a submerged arc welding (SAW) apparatus in which automated voltage balance and offset control techniques may be employed according to an example embodiment.

FIG. 3 is a block diagram of a submerged arc welding (SAW) apparatus in which automated voltage balance and offset control techniques presented herein may be employed according to an example embodiment. The apparatus 300 is configured to weld a workpiece 310, for example. By way of non-limiting examples, the welding process can be performed to produce a butt weld or a fillet weld, as is known in the art, though the described techniques are not limited to any particular type of welding geometry or materials. Apparatus 300 includes a wire feeder 315 to guide a welding wire 318, stored in a spool 320, towards workpiece 310 at a speed that is controllable with a wire feed speed control signal provided via link 330 as the welding operation moves in the welding direction D1. While shown in FIG. 3 as advancing a single welding wire for simplicity, it will be understood that wire feeder 315 can, in general, feed any suitable number of welding wires to workpiece 310. For example, a twin wire feeder mechanism can be used to simultaneously supply two "hot" wires to the welding site, where both wires are supplied with welding current and form an arc with the weld pool/workpiece. Using twin wires allows the energy density in the arc to be more focused, and enables melting more wire with a certain amperage level, resulting in a higher deposition rate and greater productivity relative to using the same amount of energy in a single wire arrangement. Whereas a wire feed speed of 1-3 meters/minute may be typical for a 4 mm single wire arrangement, with a twin wire arrangement, a wire feed speed of up to 4 meters/minute are achievable.

According to another example, a third "cold" wire can be supplied to the welding site along with two hot wires, where the cold wire does not convey a welding current and relies on the excess heat energy of the weld pool to melt the advancing cold wire. Where two or more welding wires are supplied, the welding wires may be advanced by separate or independent feeding components of wire feeder 315, or some or all of the welding wires can be advanced by common or interdependent components of wire feeder 315. As used herein, the term "welding wire" is not limited to any particular cross-sectional geometry or size and may include both consumable electrodes having a round cross section and other cross-sectional shapes including strip-shaped materials such as cladding.

Apparatus 300 further includes a flux delivery system, including a flux hopper 340 that is a repository for flux 345. Flux hopper 340 is configured to selectively deliver flux 345 to a flux drop 347 disposed proximate to a tip 319 of the welding wire 318 near the welding area on workpiece 310. Fluxes are generally granular fusible minerals typically containing oxides of manganese, silicon, titanium, aluminum, calcium, zirconium, magnesium and other compounds such as calcium fluoride. The flux 345 may be specially formulated to be compatible with a given welding wire type so that the combination of flux and wire yields desired mechanical properties. During use, the flux reacts with the weld pool to produce a weld metal chemical composition and resulting mechanical properties. It is common practice to refer to fluxes as "active" if they add manganese and silicon to the weld. The amount of manganese and silicon added may be influenced by the arc voltage and the welding current level. When molten, the flux becomes conductive, and provides a current path between the welding wire 318 and the workpiece 310. The flux 345 may also reduce spatter and sparks and suppress ultraviolet radiation and fumes. In the depicted embodiment, flux 345 is delivered (i.e., by a nozzle of the flux drop 347) on the leading edge of wire feeder 315 to produce a protective layer 350 over a molten slag pool 352 above the metal weld pool 354.

Apparatus 300 also includes a power supply 360 to supply a weld current to welding wire 318. Power supply 360 is configurable to maintain a desired arc voltage and to supply a desired welding current to welding wire 318. Power supply 360 is also configured to supply an AC welding power signal with varying balance and offset parameters. Power supply 360 may include any number or type of power source devices capable of delivering DC power and AC power to welding wire 318, such as a welding converter, a welding transformer, a rectifier, a thyristor-controlled rectifier or an inverter. A controller 370 is configured to control power supply 360, via link 348, to select a suitable weld current and wave form to carry out the welding techniques described herein. Controller 370 may also provide the wire feed speed control signal to wire feeder 315 via link 330. More specifically, controller 370 includes a memory 372 with balance/offset control logic 375 stored therein. The balance/offset control logic 375 is configured to perform, e.g., the operations discussed below in connection with FIGS. 4-6.

Controller 370 may be included in apparatus 300 (i.e., included during manufacturing of apparatus 300) or connected thereto (i.e., retrofitted to the apparatus 300 and/or connected via a wired or wireless connection). For example, in some embodiments, controller 370 is local to apparatus 300 (i.e., included in, embedded in, or connected to power supply 360), and the operations of controller 370 may be an integral part of power supply 360 and executed by components included in power supply 360 (e.g., controller 370 may include a user interface and power supply 360 may regulate the feed speed of welding wire 318). However, in other embodiments, controller 370 may be remote from apparatus 300 and may be connected thereto via a network connection (i.e., a network connection formed by a communication interface included in controller 370). An example computing device that is representative of controller 370 is described below in connection with FIG. 7.

Weld current from power supply 360 is controllable to provide the electrical arc between a tip of welding wire 318 and workpiece 310, such that power supply 360 forms an electrical circuit with welding wire 318, a welding arc 335, and workpiece 310. Heat from the welding arc 335 melts the tip to create the weld pool 354. The heat also melts flux 345 to form molten slag 352 that covers the weld pool 354 to protect the welding process from the environment. The arc voltage is measured at a suitable point in the electrical circuit (e.g., at the power supply or the wire feeder) indicating the welding arc voltage between the tip of welding wire 318 and workpiece 310, and is provided to controller via, e.g., link 330. The techniques described herein are not limited to any particular manner of measuring the arc voltage or any particular location at which the arc voltage may be measured. Moreover, the measurement of the arc voltage may be direct, i.e., an actual voltage measurement, or indirect, i.e., measurement of an operating parameter than is indicative of the arc voltage or from which the arc voltage can be derived (e.g., measurement of power, arc length, or load resistance).

As also shown in FIG. 3, apparatus 300 includes a scanner 380 that is in communication with controller 370 via link 385. Scanner 380 may be a laser scanner, and/or one or more cameras, that scan dimensions of the resulting weld as it is laid down. Data collected by the scanner 380 is provided to balance/offset control logic 375 via link 385. Balance/offset logic 375 can then determine whether the amount of welding wire deposition is consistent with an expected cross-sectional area for the resulting weld, and if there is a discrepancy, balance/offset control logic 375 may then adjust balance and/or offset of the AC welding power wave form signal to compensate for the discrepancy (i.e., to increase or decrease the deposition rate).

Figure 4:
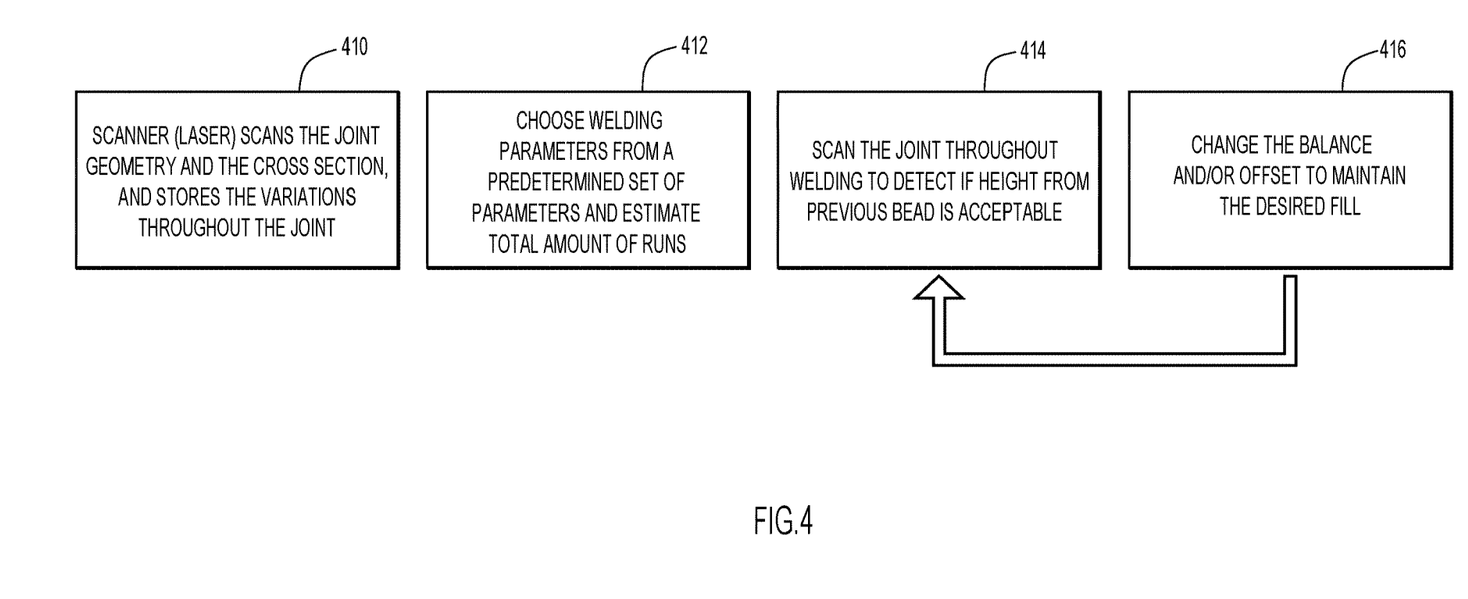
FIG. 4 is a flow diagram of an adaptive welding approach according to an example embodiment.

FIG. 4. is a flow diagram of an adaptive welding approach according to an example embodiment. As shown, at 410, a scanner (e.g., a laser) scans a weld joint geometry and cross section, and stores associated measurement values for the length of the joint. At 412, the system chooses welding parameters from a predetermined set of parameters and makes an estimate of the total amount of runs. At 414, the scanner, placed in front of the welding torch scans the joint throughout the welding process to detect if the height from a previous bead is acceptable (i.e., within a predetermined tolerance or whether the cross-sectional area is consistent with an expected result). At 416, the system controls balance and/or voltage offset to maintain the desired fill.

Figure 5:
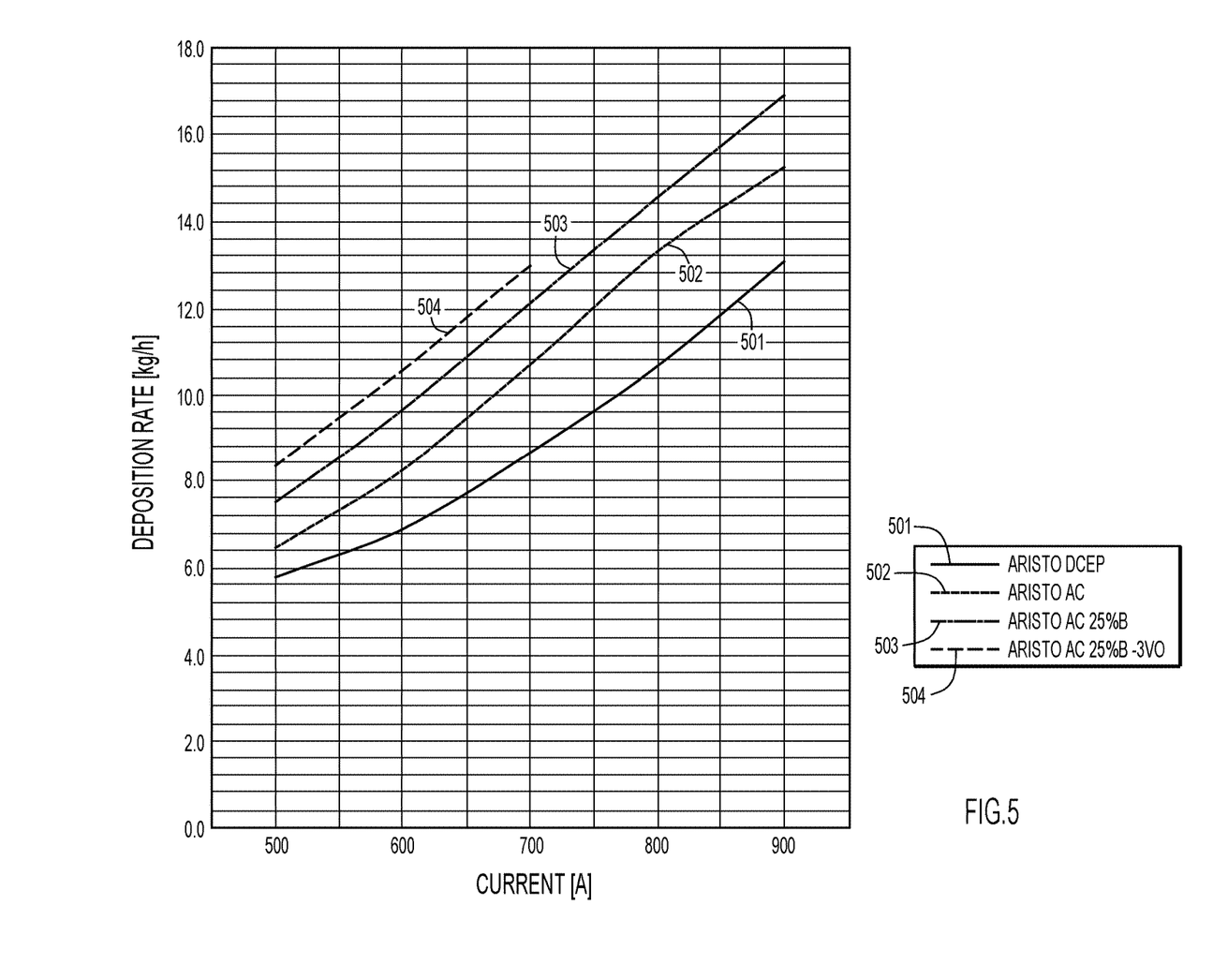
FIG. 5 is a graph showing the results of controlling balance and offset to achieve higher deposition rates for given amounts of current according to an example embodiment.

FIG. 5 is a graph showing the results of controlling balance and offset to achieve higher deposition rates for given amounts of current according to an example embodiment. The graph of FIG. 5 represents the operation of an ESAB™ Aristo 1000™ power supply operating in several different modes resulting in different deposition rates for a given current. Plot 501 represents the operation of the power supply in a DC electrode positive (EP) mode. Plot 502 represents the operation of the power supply in an AC mode, and shows an approximate 10-20% increase in deposition rate. Plot 503 represents the operation of the power supply with a 25% balance adjustment, which provides yet another 10-15% in deposition rate. Finally, plot 504 represents operation of the power supply with 25% balance and a −3V offset, which provides still another 5% increase in deposition rate compared to plot 503. Thus, as can be seen from the series of plots in FIG. 5, the use of balance and offset to control an AC welding power signal waveform can provide increased amounts deposition of welding wire for a given amount of current.

The following describes an approach for determining balance and offset values by balance/offset control logic 375 according to an example embodiment.

Adaptive Balance

In an embodiment, balance/offset control logic 375 continuously calculates the deposited cross section of filler metal using data received from scanner 380.

$$A = \pi * r^2 * wfs/ts$$

A=cross section deposited [mm$^2$]
r=radius of wire [mm]
wfs=wire feed speed [mm/min]
ts=travel speed (welding speed) [mm/min]

At the start of a welding session, balance/offset control logic 375 detects a wfs when welding in CA mode (Constant Amperage). That wfs is then be used as a baseline for adjustments in balance and offset to deposit more or less.

As an example, consider a system that is welding at AC 650 A with a 4 mm wire, which is consistent with the example of the welding processes represented in the plots of FIG. 5. Balance/offset control logic 375 detects a wfs of −1620 mm/min. If balance/offset control logic 375 determines that there is a need to fill more it can adjust the balance in the range of 25-75%. The additional wire feed speed (to achieve the additional fill, and thus desired cross section) will vary according to $$wfs_b = -8*B + 400$$

B=Balance [%]

Estimated total cross section area is then calculated according to:

$$A_t = \pi * r^2 * (wfs + wfs_b)/ts$$

Adaptive Offset

The offset can be adjusted according to a linear function such as:

$$wfs_{ol} = -33*O$$

O=Offset[V]

Estimated total cross section area is then calculated according to:

$$A_t = \pi * r^2 * (wfs + wfs_{ol})/ts.$$

The offset can also be estimated using a quadratic equation such as:

$$wfs_{oq} = 3*O^2 - 35*O$$

Estimated total cross section area is then calculated according to:

$$A_t = \pi * r^2 * (wfs + wfs_{oq})/ts.$$

Adaptive Offset and Balance

The total variation in deposited cross section can then be calculated and estimated according to:

$$A_t = \pi * r^2 * (wfs + wfs_b + wfs_{oi})/ts, \text{ or:}$$

$$A_t = \pi * r^2 * (wfs + wfs_b + wfs_{oq})/ts$$

Those skilled in the art will appreciate that the coefficients employed in the foregoing formulas may vary depending on wire dimension, whether solid or cored wires are used, and/or whether a single or multiple welding wires are used.

Figure 6:
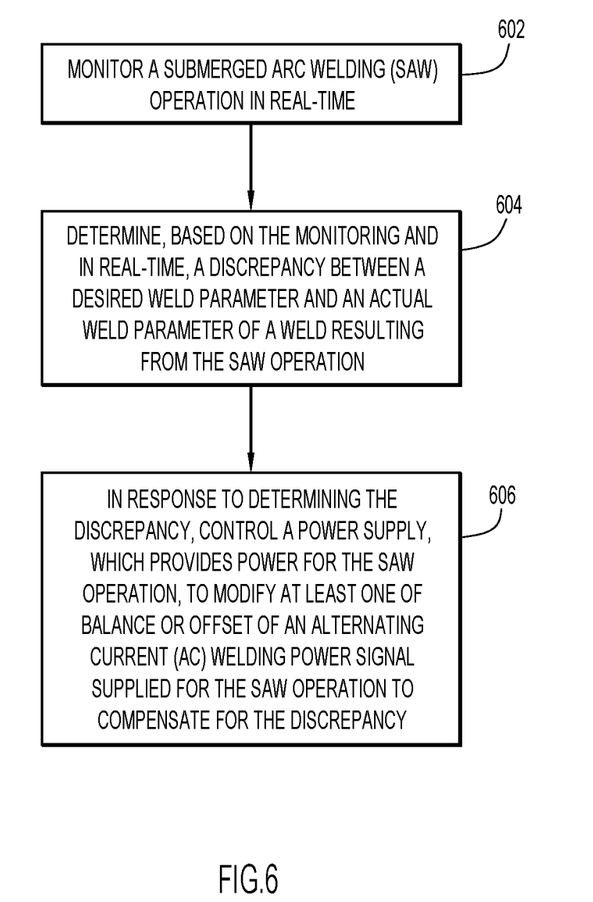
FIG. 6 is a flow chart illustrating a series of operations for a welding process according to an example embodiment.

FIG. 6 is a flow chart illustrating a series of operations for a welding process according to an example embodiment. At 602, a process (e.g., laser scanning) monitors a submerged arc welding (SAW) operation in real-time. At 604, the process determines, based on the monitoring and in real-time, a discrepancy between a desired weld parameter and an actual weld parameter of a weld resulting from the SAW operation. And, at 606, and in response to determining the discrepancy, controlling a power supply, which provides power for the SAW operation, to modify at least one of balance or offset of an alternating current (AC) welding power signal supplied for the SAW operation to compensate for the discrepancy.

Figure 7:
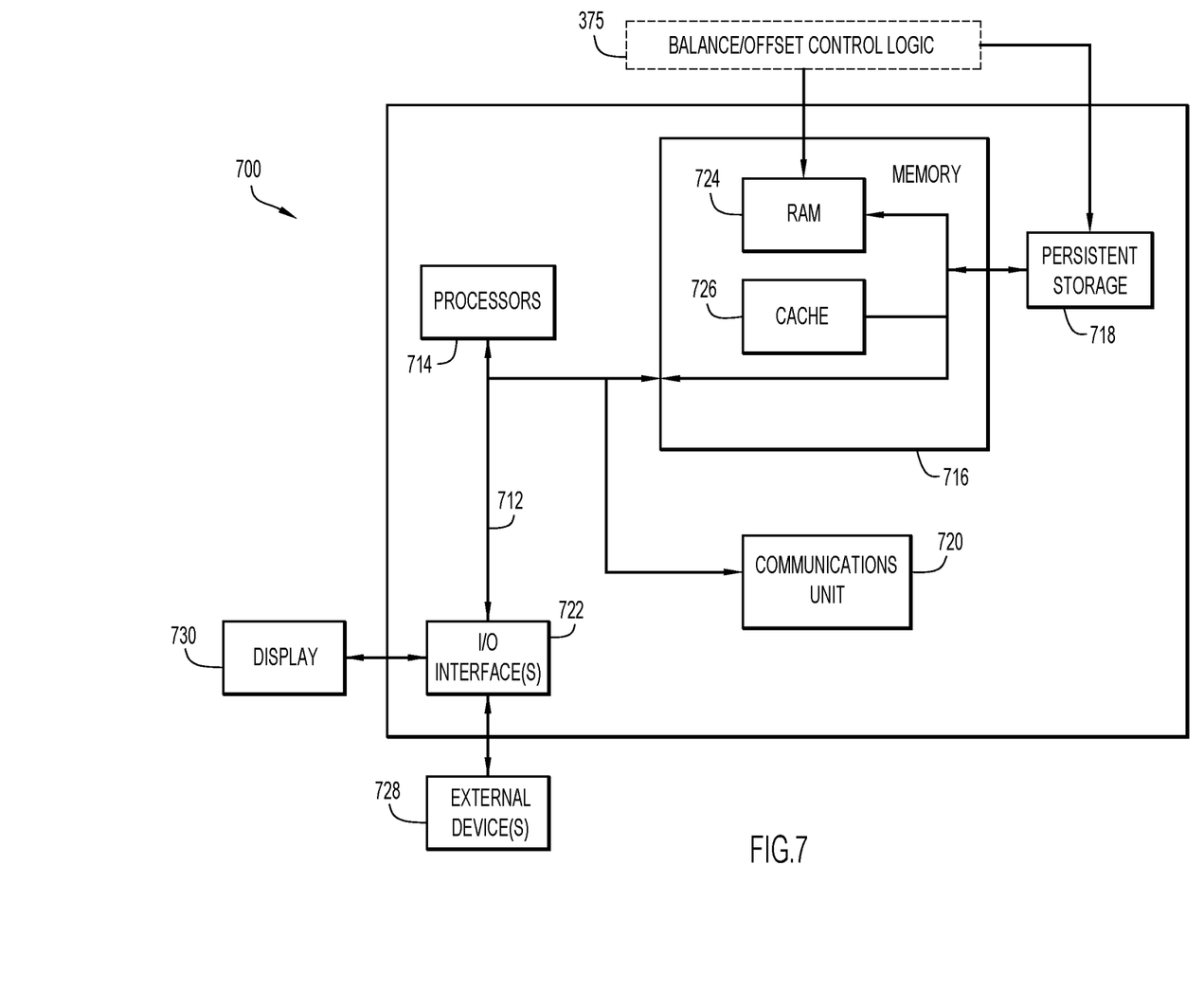
FIG. 7 depicts a computing device that may be configured to execute, among other things, the series of operations of FIG. 6 according to an example embodiment.

FIG. 7 depicts a computing device that may be configured to execute, among other things, the series of operations of FIG. 6 according to an example embodiment. More specifically, FIG. 7 depicts a device (e.g., a controller) that executes balance/offset control logic (e.g., 375) to perform the operations described herein. It should be appreciated that FIG. 7 provides only an illustration of one embodiment and does not imply any limitations with regard to the environments in which different embodiments may be implemented. Many modifications to the depicted environment may be made. Indeed, in many implementations of a controller configured to host balance/offset control logic 375, much of the hardware described below may not be needed.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for appropriate logic may be stored in memory 716 or persistent storage 718 for execution by processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., embedded, desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To summarize, in one form, a method is provided and includes monitoring a submerged arc welding (SAW) operation in real-time; determining, based on the monitoring and in real-time, a discrepancy between a desired weld parameter and an actual weld parameter of a weld resulting from the SAW operation; and in response to determining the discrepancy, controlling a power supply, which provides power for the SAW operation, to modify at least one of balance or offset of an alternating current (AC) welding power signal supplied for the SAW operation to compensate for the discrepancy.

In an embodiment, the desired weld parameter and the actual weld parameter is a deposition rate of the weld by the SAW operation In another embodiment, the desired weld parameter and the actual weld parameter is a cross sectional area filled by the SAW operation In an embodiment, the monitoring comprises scanning the SAW operation with a laser scanner.

The method may further include controlling the power supply to apply the at least one of balance or offset to the alternating current (AC) welding power signal based on a predetermined initial wire feed speed.

The may also include controlling the power supply to apply the at least one of balance or offset to the alternating current (AC) welding power signal based on a predetermined initial workpiece travel speed.

The method may still further include controlling the power supply to apply the at least one of balance or offset to the alternating current (AC) welding power signal while maintaining a predetermined heat input for the weld.

The may include adjusting a wire feed speed in response to a change in the balance or offset, and adjusting the wire feed speed may include adjusting the wire feed speed based on a linear function, or based on a quadratic function.

In another form a submerged arc welding (SAW) apparatus is provided and includes a wire feeder mechanism to guide at least one welding wire toward a workpiece; a flux delivery system to supply flux to the workpiece; a power supply to supply alternating current (AC) welding power signal to the welding wire to create a molten weld pool on the workpiece; and a controller configured to: determine a discrepancy between a desired weld parameter and an actual weld parameter of a weld formed by the SAW apparatus, and modify, in real-time, at least one of balance or offset of the AC welding power signal to compensate for the discrepancy.

In an embodiment, the desired weld parameter and the actual weld parameter is a deposition rate of the weld by the SAW apparatus.

In another embodiment, the desired weld parameter and the actual weld parameter is a cross sectional area filled by the SAW apparatus.

The apparatus may further include a laser scanner, wherein the controller is configured to monitor the weld formed by the SAW apparatus by receiving information from the laser scanner.

In an embodiment, the controller may be configured to control the power supply to apply the at least one of balance or offset to the AC welding power signal based on a predetermined initial wire feed speed.

In an embodiment, the controller may be configured to control the power supply to apply the at least one of balance or offset to the AC welding power signal based on a predetermined initial workpiece travel speed.

In an embodiment, the controller may be configured to control the power supply to apply the at least one of balance or offset to the AC welding power signal while maintaining a predetermined heat input for the weld.

In an embodiment, the controller may be configured to adjust a wire feed speed in response to a change in the balance or offset.

In yet another form, one or more non-transitory computer-readable storage media are encoded with software comprising computer executable instructions and, when the software is executed, are operable to: determine a discrepancy between a desired weld parameter and an actual weld parameter of a weld formed by a submerged arc welding (SAW) apparatus, and modify, in real-time, at least one of balance or offset of an AC welding power signal generated by a welding power supply to compensate for the discrepancy.

In an embodiment, the instructions to control the welding power supply may include instructions operable to: control the welding power supply to apply the at least one of balance or offset to the AC welding power signal based on a predetermined initial wire feed speed.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A method comprising:
   scanning a geometry of a joint;
   estimating, based on the scanning, a number of runs to weld the joint using a submerged arc welding (SAW) operation;
   conducting and monitoring the SAW operation;
   determining, based on the monitoring, the geometry of the joint, and the number of runs to weld the joint, a discrepancy between a desired weld parameter and an actual weld parameter of a weld resulting from the SAW operation; and
   in response to determining the discrepancy, and during the SAW operation, adaptively controlling a power supply, which provides power for the SAW operation, to modify at least one of balance or offset of an alternating current (AC) welding power signal supplied for the SAW operation to compensate for the discrepancy while maintaining a predetermined heat input for the weld.

2. The method of claim 1, wherein the desired weld parameter and the actual weld parameter is a deposition rate of the weld by the SAW operation.

3. The method of claim 1, wherein the desired weld parameter and the actual weld parameter is a cross sectional area filled by the SAW operation.

4. The method of claim 1, wherein the monitoring comprises scanning the SAW operation with at least one of a laser scanner and a camera.

5. The method of claim 1, further comprising controlling the power supply to modify the at least one of balance or offset of the alternating current (AC) welding power signal based on a predetermined initial wire feed speed.

6. The method of claim 1, further comprising controlling the power supply to modify the at least one of balance or offset of the alternating current (AC) welding power signal based on a predetermined initial workpiece travel speed.

7. The method of claim 1, further comprising adjusting a wire feed speed in response to a change in the balance or the offset.

8. The method of claim 7, wherein adjusting the wire feed speed comprises adjusting the wire feed speed based on a linear function.

9. The method of claim 7, wherein adjusting the wire feed speed comprises adjusting the wire feed speed based on a quadratic function.

10. A submerged arc welding (SAW) apparatus comprising:
    a wire feeder mechanism to guide at least one welding wire toward a workpiece;
    a flux delivery system to supply flux to the workpiece;
    a power supply to supply an alternating current (AC) welding power signal to the welding wire to create a molten weld pool on the workpiece; and
    a controller configured to:
        cause a scanner to scan a geometry of a joint;
        estimate, based on a result of the scan, a number of runs to weld the joint using a submerged arc welding (SAW) operation;
        determine a discrepancy between a desired weld parameter and an actual weld parameter of a weld formed by the SAW apparatus, and
        control the power supply, based on the based on the geometry of the joint and the number of runs to weld the joint, to adaptively modify at least one of balance or offset of the AC welding power signal to compensate for the discrepancy while maintaining a predetermined heat input for the weld.

11. The apparatus of claim 10, wherein the desired weld parameter and the actual weld parameter comprises a deposition rate of the weld by the SAW apparatus.

12. The apparatus of claim 10, wherein the desired weld parameter and the actual weld parameter comprises a cross sectional area filled by the SAW apparatus.

13. The apparatus of claim 10, further comprising a laser scanner, wherein the controller is configured to monitor the weld formed by the SAW apparatus by receiving information from the laser scanner.

14. The apparatus of claim 10, wherein the controller is further configured to control the power supply to modify the at least one of balance or offset of the AC welding power signal based on a predetermined initial wire feed speed.

15. The apparatus of claim 10, wherein the controller is further configured to control the power supply to modify the at least one of balance or offset of the AC welding power signal based on a predetermined initial workpiece travel speed.

16. The apparatus of claim 10, wherein the controller is further configured to adjust a wire feed speed in response to a change in the balance or the offset.

17. One or more non-transitory computer readable storage media encoded with software comprising computer executable instructions and, when the software is executed, operable to:
- cause a scanner to scan a geometry of a joint;
- estimate, based on the geometry of the joint, a number of runs to weld the joint using a submerged arc welding (SAW) operation;
- determine a discrepancy between a desired weld parameter and an actual weld parameter of a weld formed by a submerged arc welding (SAW) apparatus, and
- control a welding power supply, based on the geometry of the joint and the number of runs to weld the joint, to adaptively modify at least one of balance or offset of an AC welding power signal generated by the welding power supply to compensate for the discrepancy while maintaining a predetermined heat input for the weld.

18. The one or more non-transitory computer readable storage media of claim 17, wherein the instructions are operable to control the welding power supply to:
- modify the at least one of balance or offset of the AC welding power signal based on a predetermined initial wire feed speed.

19. The one or more non-transitory computer readable storage media of claim 17, wherein the instructions are operable to control the welding power supply to:
- modify the at least one of balance or offset of the AC welding power signal based on a predetermined initial workpiece travel speed.

20. The one or more non-transitory computer readable storage media of claim 17, wherein the instructions are operable to control the welding power supply to:
- adjust a wire feed speed in response to a change in the balance or the offset.

* * * * *